United States Patent [19]

Lewis et al.

[11] Patent Number: 4,852,154
[45] Date of Patent: Jul. 25, 1989

[54] PAY-PER-VIEW CATV SYSTEM

[75] Inventors: David R. Lewis, Portola Valley; Albert J. Perkins, San Jose; Gasper L. Raya, West Pittsburg; Michael F. Vargo, San Carlos; James E. Haggmark, Tracy, all of Calif.

[73] Assignee: Pacific Bell, San Francisco, Calif.

[21] Appl. No.: 826,082

[22] Filed: Feb. 4, 1986

[51] Int. Cl.4 .................. H04M 11/08; H04M 15/00; H04N 7/10; H04H 9/00

[52] U.S. Cl. .................................... 379/105; 358/86; 379/104; 379/246

[58] Field of Search .................. 179/2 DP, 2 A, 2 R, 179/18 FH, 5.5; 358/85, 84, 86; 455/2, 4, 5; 379/43, 44, 102, 104, 105, 127, 142, 246, 89, 92

[56] References Cited

U.S. PATENT DOCUMENTS

| 3,920,908 | 11/1975 | Kraus | 179/2 DP |
|---|---|---|---|
| 4,008,369 | 2/1977 | Theurer et al. | |
| 4,170,782 | 10/1979 | Miller | |
| 4,381,522 | 4/1983 | Lambert | |
| 4,451,701 | 5/1984 | Bendig | 358/85 |
| 4,499,568 | 2/1985 | Gremillet | 358/85 |
| 4,590,516 | 5/1986 | Abraham | 358/85 |
| 4,742,513 | 5/1988 | Reichard, Jr. et al. | |
| 4,755,872 | 7/1988 | Bestler et al. | 358/86 |
| 4,763,191 | 8/1988 | Gordon et al. | 358/86 |

FOREIGN PATENT DOCUMENTS

| 217308 | 4/1987 | European Pat. Off. | |
|---|---|---|---|
| 85/03830 | 8/1985 | PCT Int'l Appl. | 358/85 |

OTHER PUBLICATIONS

Zenith Electronics, "Advanced New Cable TV Technology Developed for Impulse-Pay-Per-View", Released Las Vegas, NV, Jun. 3, 1985 by Zenith Electronics, Glenview Illinois, copy available in DIALOG File 621.
Telephone Engineer & Management, May 12, 1986, p. 6, "Telephone Digest: Michigan Bell".
The Yankee Group, "Cable and the Telcos: From Confrontation to Détente", Report No. 83-1, Jun. 1983, pp. 162-167.
Bulfer et al., "A Trial National Pay-Per-View Ordering and Billing System", 1986 NCTA Technical Papers, pp. 134-139, presented at Cable 86, Dallas, Texas, Mar. 15-18, 1986© National Cable Television Association, Washington, D.C.
Sirazi et al., "Comparative Study of Hyprid-IPPV Implementations", presented Jun. 3, 1985, at Cable 85, Las Vegas, NV.
A. F. Bulfer, "Dial-A-View", Talk Given at the Motion Picture Industry Seminar, Dec. 3, 1984, Los Angeles, CA.
Science Dynamics, Corp., Advertisement, "Profit From Impulse Pay-Per-View", *Telephony*, Jul. 19, 1986, p. 59.
Bowling, Tom, "Pay TV: a Pay-Per-Minute System Prototype", Television: Journal of the Royal Television Society, Mar./Apr. 1984, pp. 79-83.

*Primary Examiner*—Keith E. George
*Attorney, Agent, or Firm*—Fitch, Even, Tabin & Flannery

[57] ABSTRACT

A pay-per-view CATV system which is interfaced with the switched public telephone system is described. A subscriber selects a specific scheduled television event by dialing a telephone number which uniquely identifies the selected event. The called and originating numbers are identified, digitized and combined to form a digital word. The digital word is then transmitted to the CATV supplier.

9 Claims, 2 Drawing Sheets

PAY-PER-VIEW CATV SYSTEM

The present invention relates generally to television viewing and more particularly to novel apparatus and techniques for enabling a viewer to conveniently select a particular one of scheduled programming events and to be billed only for such events as may from time to time be selected.

BACKGROUND OF THE INVENTION

Cable television (CATV) programming has become widely available to the public on a subscription basis. Usually, the subscriber has several levels of service available, with the cost of the subscription dependent upon the options available with each level of service. For example, the basic subscription service usually includes local VHF and UHF programming, which is normally also broadcast for antenna reception throughout the subscription area, and remote VHF and UHF programming from nearby cities, which would not be generally receivable with a local reception antenna at the subscriber premises.

Additional CATV services above the basic service, for example, include movie channels which release the latest movies, and sports channels which make available sporting events normally blacked out from commercial television. However, a subscriber may not customarily obtain a subscription to one or more of these optional services without also obtaining a subscription to the basic service.

The basic subscription service charges are computed from the cost to rebroadcast the local and remote programming and a rental fee for CATV company equipment located at the subscriber premises. Such equipment may include decoders or descramblers for example. The subscription service charges to the optional CATV services includes the right to receive all scheduled programming events provided by the optional service. The subscription charge is based upon the cost to the CATV company to make the service available and the royalties payable to the copyright owners of the programmed events. However, many potential subscribers do not desire to view all scheduled events but merely from time to time desire to view only a selected event, such as a recently released movie or the rerelease of an old movie classic. For these viewers the subscription charges of the optional service may be too large to justify the purchase of the subscription for a limited use.

In order to expand the market base of CATV subscribers, there have been several attempts to develop systems wherein a viewer may preselect and only receive an individual programming event. With this type of system the subscriber would not be forced to subscribe to a basic service which he may not desire should normal antenna reception provide adequate service, or be forced to pay the subscription charge for the entire optional service, i.e., paying royalties on all events which the potential subscriber does not wish to view. A CATV system in which the subscriber would only have to pay rental fees for the lease of CATV company equipment and service charges for the events viewed has the potential of expanding the subscriber base of CATV companies.

Two different types of systems have heretofore been developed wherein the subscriber may selectively view a scheduled programming event. In the first group of these systems, the subscriber accesses the CATV computer over phone lines and selects an event from a menu by entering the appropriate data from the telephone key-pad. The menu may either be a recorded voice prompt transmitted through the telephone or a video prompt simultaneously displayed on the subscribers television set. For example, see U.S. Pat. No. 4,381,522 for "Selective Viewing" and U.S. Pat. No. 4,008,369 for a "Telephone Interface Subscription Cable Television System." The second group of systems utilizes an interrogation of a subscriber terminal at the subscriber premises. The subscriber terminal stores information concerning those programs which the subscriber has viewed. The CATV computer interrogates the subscriber terminal over phone lines to retrieve the stored data for billing purposes. For example, see U.S. Pat. No. 4,170,782 and "Pay TV: A Pay per Minute System Prototype", Television: Journal of the Royal Television Society, March 1984, pp. 79-83.

In the above cited '522 patent, there is provided a printed menu of available selectable programs, each designated by a number. The menu is stored in the computer located at the CATV company and broadcast over a menu channel. A viewer at the subscriber premises selects a program by first dialing the CATV station telephone number. The telephone system then connects the viewer's telephone to the CATV computer. The CATV computer responds by transmitting to the viewer an audible tone to signal the viewer to dial the number corresponding to the desired program on the menu. The CATV computer stores the information on the program source location, the status of the selected program source, and the available channels and the schedules for each.

The significant disadvantage and limitation of the system described in the '522 patent is that the CATV Company would require additional information on how to bill the subscriber. Such billing information may only be obtained by additional equipment that would have to be located at the subscriber premises or by requiring the subscriber to input an account number along with the men selection. Such billing information equipment requires additional technical complexity not described in the '522 patent. Accordingly, the '522 patent is described as being most useful for providing video-tex information for the advertisement of products and services. However, where copyrighted material is required, such system does not allow for convenient means for billing the subscriber for service charges.

The above cited '369 patent describes a PABX telephone interface cable television system especially useful in hotels and motels for distributing free and premium program channels via a coaxial cable television signal distribution network to one or more subscriber terminals and associated television sets. Again, the subscriber dials a predetermined access number so that the subscriber can be connected with a control and monitoring station. After a telephone connection is made, the program requests must be subsequently entered through the telephone key-pad. The control and monitoring station includes means for sending output signals to a paper tape printer to provide a record of the channel use activity of each subscriber terminal in the system. Hence, no automatic billing is contemplated in this system, but must be subsequently added to the bill for hotel services.

The above mentioned publication discloses one such automatic billing system wherein a CATV company provided recording device makes a record of the subscriber's usage of the CATV programming events. The recording device, located at the subscriber premises, is periodically interrogated by the CATV company over telephone lines to obtain subscriber usage information necessary to generate a bill to the subscriber. A significant disadvantage and limitation of using a recording device at the subscriber premises is the possibility that the subscriber ma tamper with or bypass the recording device, ultimately resulting in a loss of revenues to the CATV company.

SUMMARY OF THE INVENTION

Accordingly, it is an object of the present invention to overcome one or more of the disadvantages describe hereinabove.

It is a primary object of the present invention to provide a cable television system wherein the subscriber may select only those events which may from time to time be desired.

A principle object of the present invention is to provide a cable television system wherein the subscriber is billed only for those events which are selected.

Another object of the present invention is to provide a cable television system which eliminates the need for the subscriber to enter program selection or account number information through the telephone interface.

Yet another object of the present invention is to eliminate the use of a recording device located at the subscriber premises to record subscriber usage of the cable television system.

According to the present invention, a pay-per-view CATV system is interfaced with the switched public network telephone system. A conventional switched public network telephone system has at least one central office switch and a plurality of subscriber loops operatively coupled to the central office switch. Each subscriber loop extends to a subscriber location and is terminated by at least one telephone identified by an originating telephone number. The subscriber selects a specific one of the scheduled television programming events by selecting a telephone number which uniquely identifies the selected event. To select an event, the subscriber dials the telephone number for the selected event. This call is handled by the central office switch in a conventional manner. The called and originating numbers are identified, digitized and combined to form a digital word. The digital word is then transmitted to the CATV supplier. From the digital word, the CATV supplier can identify the subscriber and the subscriber selected event so that the subscriber receives the selected event and a bill for viewing such event.

Other objects, advantages and features of the present invention will become apparent from the following specification when read in conjunction with the drawings, and from the appended claims.

DESCRIPTION OF THE PREFERRED EMBODIMENT

Figure 1:
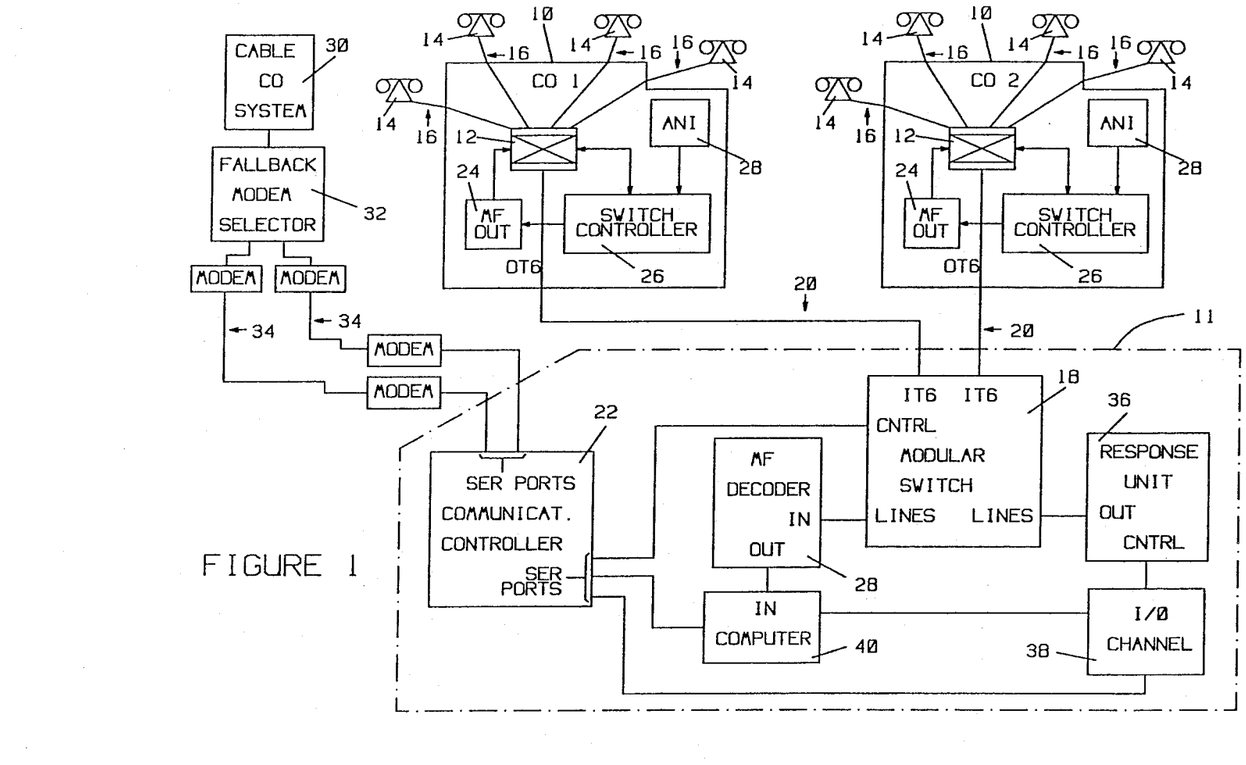
FIG. 1 is a block diagram of a pay-per-view CATV system constructed according to the present invention.

Referring now to FIG. 1, there is shown a CATV pay-per-view system constructed according to the principles of the present invention. The pay-per-view system of the present invention employs a service node 11 designed for interaction between the established switched public telephone network which includes a plurality of central offices 10, and the cable company system 30.

To avoid confusing the principles of the present invention, only two central offices 10 are illustrated in FIG. 1. Each central office 10 includes a central office switch 12. A plurality of telephones 14 are each operatively coupled to its respective central office switch 12 over an associated one of a plurality of subscriber loops 16. Each of the subscriber loops 16 is an ordinary twisted pair which extends from the central office switch 12 located in the respective central office 10 to the telephone 14 which is located at the subscriber premises. The routing of calls between telephones 14 served by a single central office 10 or between telephones 14 served by separate central offices 10 is well known and need not be described herein. For example, it is to be understood that trunk lines (not shown) connect the central offices 10 to each other within a telephone system.

According to the present invention, the service node 11 includes a modular switch 18 operatively connected to a plurality of the central offices 10. More specifically, the modular switch 18 is coupled to each central office switch 12 over a standard one-way outgoing trunk 20. For example, trunk 20 may be a traffic service position system (TSPS) trunk which normally connects a central office switch 12 to an operator's console. However, other standard trunk types may be used in the present invention, as long as such trunks have the capability of having called and calling directory numbers sent over them as hereinbelow described.

The modular switch 18 performs telephonic switching and signaling functions under the control of the communications controller 22 described hereinbelow, which is also part of the service node 11. The modular switch 18 provides trunk termination for each of the outgoing trunks 20 connected thereto and trunk supervision sensing from the originating central office 10 to the communications controller 22. Such trunk supervision sensing includes on-hook and off-hook sensing. The modular switch 18 also provides trunk supervision signaling toward the originating central office 10 both in response to commands from the communications controller 22 and automatically, according to established conventions. One type which may be employed in the present invention as the modular switch 18 is the MSP model modular switching peripheral commercially available from Redcom Laboratories.

The communications controller 22 provides for overall system control. It acts as the controller of the modular switch 18 and oversees the processing of incoming calls arriving on the trunks 20. The communications controller 22 assigns a unique state variable to each of the outgoing trunks 20 terminated by the modular switch 18 under its control. The communication controller 22 steps the state of each trunk 20 through discrete states as events occur during the call handling process. The state of the trunk state variable is stepped through a closed cycle (idle to idle) once for each incoming call process. A second function of the communications controller is to serve as the originator of messages, containing the digital words described hereinabove, which are sent to the cable vendor premises, as described hereinbelow. In this respect, the communications controller implements one or more layers of a data communications protocol. This protocol is chosen to ensure the error free transportation of these messages.

In a preferred embodiment of the present invention, the communications controller 22 is a super-microcomputer running suitable applications specific programs. An example of one such super-microcomputer is the Tricept model microcomputer commercially available from Morrow Designs, Inc.

As mentioned hereinabove, the pay-per-view system of the present invention shares each central office switch 12 with normal message traffic. The central office 10 will process calls made under this invention no differently than it processes any other message traffic. A cyclic call handling process is performed by shared equipment within each central office 10, such equipment operating without modification. The phases within the central office 12 cyclic call handling process include call origination, dialed directory number collection, translation, idle trunk search, trunk seizure, digit outpulsing, audio path completion, talk and call termination. In summary, the central office switch 12 does not treat calls made under the present invention any differently than other message traffic. Following a call setup phase, the central office switch 12 creates a voice grade path through itself, which connects the caller to the outgoing trunk 20. The call to the pay-per-view telephone number is processed similar to a toll message call usually handled by a conventional Class 4 switch.

Each central office switch 12 includes a plurality of multifrequency (MF) outpulsers, generally indicated at 24. In conventional message traffic, the MF outpulser sends digits and simple process state information to a destination central office 10 over the interoffice connection trunks (not shown). These MF outpulsers 24 are used for the pay-per-view system of the present invention in a manner similar to that used for other interoffice calls. A central office (CO) switch controller 26 located in each central office 10 selects an idle MF outpulser from the pool of MF outpulsers 24 when one is needed. The CO switch controller 26 controls the establishment of an audio path from the selected MF outpulser to the outgoing trunk 20.

At the beginning of the call set up phase, the CO switch controller 26 detects when one of the telephones 14 goes "off-hook" by conventionally sensing a DC current in the associated subscriber loop 16. The called number is collected from the subscriber loop 16 by the CO switch controller 26 as it is dialed. If the collected called number is one assigned to a cable vendor programming event, the central office switch controller 26 will, as a result of the execution of a conventional database look up function, identify an outgoing trunk 20 connecting the central office switch 12 to the modular switch 18, as the destination of such a call. Under the control of the CO switch controller 26, a conventional automatic number identification (ANI) unit 28 conventionally identifies the calling or originating number. After the CO switch controller 26 determines that the destination of a given call is an outgoing trunk 20, and after the calling number has been determined, the CO switch controller 26 will select an idle MF outpulser 24, seize the outgoing trunk, create a voice path through the CO switch 12 connecting the selected MF outpulser 24 to the outgoing trunk, and send the called and calling numbers to the selected MF outpulser. The selected MF outpulser then outpulses the called and calling numbers as multifrequency (MF) tones. The MF tones are sent to the modular switch 18 over the outgoing trunk 20 of the same central office 10 in which the MF outpulser resides.

Associated with each modular switch 18 is a multifrequency receiver pool 28, for receiving the MF tones generated by the multifrequency outpulsers and transmitted over the outgoing trunks 20. Each MF receiver pool 28 includes a plurality of MF decoders which share the use of a single board computer (SBC) 40. The term MF decoder is used to refer to the device which converts MF tones into digital form. The MF receiver pool 28 connects to the modular switch 18 and converts MF tones arriving over one of the trunks 20 from an originating central office 10 into a digital form. More particularly, the modular switch 18 connects to each MF receiver pool 28 via a standard phone line or twisted pair. An audio path is created through the modular switch connecting the incoming trunk to a unique MF receiver. The SBC 40 scans the digital output of several of the MF decoders looking for digits, and collects contiguous digits to form a character string or digital word containing a called or calling number. The SBC 40 sends this string, together with its own identity, to the communications controller 22. In a preferred embodiment of the present invention, each MF decoder may be a Model No. M-985 decoder commercially available from Teltone in conjunction with a single board computer commercially available from Micromint Company, to construct each MF receiver pool 28. Alternatively, the MF receiver pool can be integrated into the modular switch without altering the system's function.

Connected to the communications controller 22 is the cable vendor equipment including cable company system computer 30 and fall-back modem selector 32. The lines connecting the service node communications controller 22 to the fall-back modem selector 32 are leased lines and will always be active. The data link between the service node and CATV vendor equipment connects on the service node at communications controller 22. The line is asynchronous and uses conventional format and protocol. Of course, modems are provided at each end of the leased lines 34 for providing data communications. The service node modem will be operated in its originating mode and cable company equipment will respond in answer mode. These modes are maintained for as long as normal operation progresses.

Also associated with the modular switch 18 is an audio response unit pool 36 (ARUP) controlled by the SBC 40 through an input/output channel 38 of the SBC 40 in order to provide confirmation messages to the-filling party. Each ARUP 36 contains several audio response units (ARU). Each ARU has a message loaded by placing an ordinary phone call to the number assigned to a standard phone line (not shown) connected to the ARU, keying in a password and following a product-specific update procedure. In a preferred embodiment of the present invention, each ARU is a digital announcer commercially available from Cook Electric.

Figure 2:
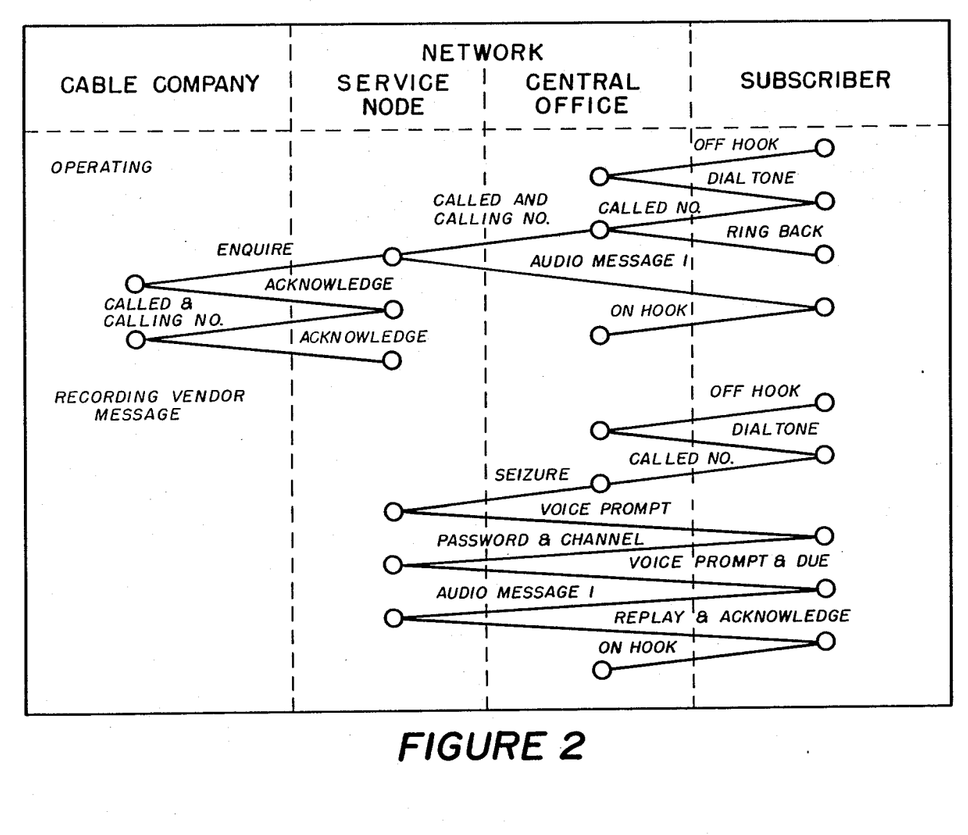
FIG. 2 is a flow chart illustrating the sequence of steps according to the present invention.

With further reference to FIG. 2, there is shown a flow diagram of the operation of the pay-per-view system of the present invention. As described above, when the subscriber takes his telephone 14 off hook, a DC current is developed in the associated subscriber loop 16. The central office switch 12 detects this DC current and returns a dial tone over the subscriber loop 16 to the subscriber telephone 14. When the subscriber hears the dial tone the subscriber dials the telephone number associated with the event the subscriber wishes. The central office switch detects the special services number and routes the call to the service node. Furthermore, as described hereinabove, the called and calling numbers are transmitted to the service node which then provides ring back tone to the caller. The audio response unit pool through the modular switch 18 will return an audio message to the subscriber through the established voice path described above. When the subscriber hears the confirmatory message, the subscriber simply returns his telephone 14 to on hook. The central office switch 12 detects the telephone 14 going on hook and terminates the call.

As this call is terminated, the communication controller 22, storing the called and calling numbers, will initiate a link to the CATV cable company as hereinabove described. An inquiry is first transmitted to the cable company equipment and if operating, and acknowledgment is received. Upon receipt of the acknowledgment, the communications controller 22 will download the called and calling number digitals words which it has stored for receipt by the cable company. At the end of this transmission, the cable company will send an acknowledgment back to the communications controller 22 thereby terminating that connection.

There has been described above novel apparatus and techniques for a pay-per-view system wherein a subscriber may preselect a specific one of a plurality of television programming events and be billed only for that event. However, modifications, variations and other uses of the present invention may be made by those skilled in the art without departing from the inventive concepts herein. For example, the techniques of the present invention may be expanded to other special services such as the current 976 service. Accordingly, the present invention is to be limited solely by the scope of the following claims.

What is claimed is:

1. In a switched public network telephone system having at least one central office switch, a plurality of subscriber loops, and a plurality of telephones, each of said subscriber loops operatively coupling an associated one of said telephones to said central office switch, said central office switch connecting one of said telephones identified by a calling number to another of said telephones identified by said calling number originating a telephone call to said telephone identified by said called number, an apparatus for of scheduled television program events provided by a supplier of such events having premises remote from said apparatus, said apparatus comprising:
    means for detecting selected called numbers electrically coupled through any of said subscriber loops, each of said selected called numbers identifying one of said television program events;
    means for identifying the calling number of the telephone coupled to each one of said subscriber loops from which one of said selected called numbers was detected;
    means for coupling a confirmation message to the said subscriber loop identified by each said calling number in response to said detecting means detecting one of said selected called numbers;
    means for developing a digital word representing each said detected called number and each said calling number originating each said detected called number; and
    means for transmitting a said digital word to said supplier's premises, said digital word representing the called number detected by said detecting means and the calling number identified by said identifying means said transmitting means transmitting said digital word to said supplier subsequent to said coupling means coupling said confirmation message to said subscriber loop.

2. An apparatus as set forth in claim 1 further comprising:
    a central processor coupled to said transmitting means;
    means for transmitting digital data representing each said digital word developed by said developing means to said central processor;
    means coupled to said central processor for storing said digital data said transmitting means transmitting said stored digital data to said supplier's premises at regular intervals.

3. In a switched public network telephone system having at least one central office switch, a plurality of subscriber loops, and a plurality of telephones, each of said subscriber loops operatively coupling an associated one of said telephones to said central office switch, said central office switch connecting one of said telephones identified by a calling number to another of said telephones identified by a called number in response to said telephone identified by said calling number originating a telephone call to said telephone identified by said called number, a method for subscriber selection of a specific one of a plurality of scheduled television program events provided by a supplier of such events comprising the steps of:
    detecting a telephone call to one of a plurality of predetermined called numbers electrically coupled through any of said subscriber loops, each of said predetermined called numbers identifying one of said television program events;
    identifying the calling number of the said telephone which originated said detected telephone call;
    coupling a confirmation message to the said subscriber loop identified by said calling number in response to detecting one of said predetermined called numbers;
    developing a digital word representing said detected called number and the said identified calling number originating said telephone call to said detected called number; and
    transmitting said digital word to said supplier subsequent to coupling said confirmation message to the said subscriber loop identified by said calling number, said transmission originating at a location remote from said supplier's premises.

4. In a switched public network telephone system having a plurality of central office switches, a plurality of subscriber loops associated with each of said central office switches, and a plurality of telephones, each of said subscriber loops operatively coupling an associated one of said telephones to one of said central office switches, said central office switches connecting one of said telephones identified by a calling number to another of said telephones identified by said calling number in response to said telephone identified by said calling number originating a telephone call to said telephone identified by said called number, an apparatus for subscriber selection of a specific one of a plurality of scheduled television program events provided by a supplier of such events, said apparatus being remotely located with respect to said supplier's premises, said apparatus comprising:

means for detecting at each of said central office switches selected called numbers electrically coupled through any of said subscriber loops coupled thereto, each of said selected called numbers identifying one of said television program events;

means for identifying the calling number of the telephone coupled to each one of said subscriber loops from which one of said selected called numbers was detected;

means for coupling a confirmation message to the said subscriber loop identified by each said calling number in response to said detecting means detecting one of said selected called numbers;

means for developing a digital word representing each said detected called member and each said calling number originating each said called number; and means for transmitting a said digital word to said supplier said digital word representing the called number detected by said detecting means and the calling number identified by said identifying means, said transmitting means transmitting said digital word to said supplier subsequent to said coupling means coupling said confirmation message to said subscriber loop.

5. An apparatus as set forth in claim 4 further comprising means for storing each said digital word developed by said developing means, said transmitting means further comprising means for transmitting said stored digital words to said supplier at regular intervals.

6. An apparatus as set forth in claim 5 wherein said transmitting means includes a dedicated data link between said transmitting means and said supplier.

7. In a switched public network telephone system having at least one central office switch, and a plurality of telephones, each of said telephones being identified by a telephone number, said telephone system including means for operatively coupling a calling telephone to an answering telephone in response to the telephone number identifying said answering telephone being communicated to a central office switch by said calling telephone or an apparatus connected thereto, an apparatus for subscriber selection of one of a plurality of services or products offered by one or mote vendors of said services or products, said apparatus being remotely located with respect to each said vendor's premises, said apparatus comprising:

means for detecting each said selected telephone number communicated by a calling telephone to a central office switch, each said selected telephone number identifying a predetermined vendor and a specified product or service offered by said vendor, said detecting means including signal generating means for generating a signal indicating the selected telephone number so detected;

means for identifying the telephone number identifying the calling telephone which communicated a said selected telephone number;

means for coupling a confirmation message to the said subscriber loop identified by each said calling number in response to said detecting means detecting one of said selected called numbers;

means for developing a digital word representing each said telephone number detected by said detecting means and each said telephone number identified by said identifying means, said developing means being responsive to said signal generating means and said identifying means; and means for transmitting said digital word to the vendor specified by a said detected telephone number, said digital word representing the called number detected by said detecting means and the calling number identified by said identifying means, said transmitting means transmitting said digital word to said vendor subsequent to said coupling means coupling said confirmation message to said subscriber loop.

8. In a switched public network telephone system having a plurality of central offices, each said central office including a central office switch serving a plurality of telephones, each of said telephones being identified by a telephone number, said telephone system including means for operatively coupling a calling telephone to an answering telephone in response to the telephone number identifying said answering telephone being communicated to a central office switch by said calling telephone or an apparatus connected thereto, an apparatus for subscriber selection of one of a plurality of services or products offered by one or more vendors of said services or products, said apparatus being remotely located with respect to each said vendor's premises, said apparatus comprising:

means for coupling said apparatus to at least two of said central offices;

means for detecting each said selected telephone number communicated by a calling telephone to a central office switch, each said selected telephone number identifying a predetermined vendor and a specified product or service offered by said vendor, said detecting means including signal generating means for generating a signal indicating the selected telephone number so detected;

means for identifying the telephone number identifying the calling telephone which communicated a said selected telephone number;

means for coupling a confirmation message to the said subscriber loop identified by each said calling number in response to said detecting means detecting one of said selected called numbers;

means for developing a digital word representing each said telephone number detected by said detecting means and each said telephone number identified by said identifying means, said developing means being responsive to said signal generating means and said identifying means; and means for transmitting said digital word to the vendor specified by a said detected telephone number, said digital word representing the called number detected by said detecting means and the calling number identified by said identifying means, said transmitting means transmitting said digital word to said vendor subsequent to said coupling means coupling said confirmation message to said subscriber loop.

9. In a switched public network telephone system having a plurality of central offices, each said central office including a central office switch serving a plurality of telephones, each of said telephones being identified by a telephone number, said telephone system including means for operatively coupling a calling telephone to an answering telephone in response to the telephone number identifying said answering telephone being communicated to a central office switch by said calling telephone or an apparatus connected thereto, an apparatus for subscriber selection of one of a plurality of services or products offered by one or more vendors of said services or products, said apparatus being remotely located with respect to each said vendors premises, said apparatus comprising order accepting means for accepting an order from a said subscriber for one of said plurality of services or products, and order forwarding means for forwarding said accepted order to the one of said vendors providing the ordered service or product, said order accepting means comprising:

- means for coupling said apparatus to at least two of said central offices;
- means for detecting each said selected telephone number communicated by a calling telephone to a central office switch, each said selected telephone number identifying a predetermined vendor and a specified product or service offered by said vendor, said detecting means including signal indicating the selected telephone number so detected; and
- means for identifying the telephone number identifying the calling telephone which communicated a said selected telephone number, said order being accepted when said generating means identifies said calling telephone number, and wherein said order forwarding means comprises:
- means for coupling a confirmation message to the said subscriber loop identified by each said calling number in response to said order accepting means accepting said order,
- means for developing a digital word representing each said telephone number detected by said detecting means and each said telephone number identified by said identifying means, said developing means being responsive to said order accepting means accepting said order; and
- means for transmitting said digital word to the vendor specified by a said detected telephone number, said digital word representing the called number by said detecting means and the calling number identified by said identifying means, said transmitting means transmitting said digital word to said vendor subsequent to said order accepting means accepting said order.

* * * * *

UNITED STATES PATENT AND TRADEMARK OFFICE
CERTIFICATE OF CORRECTION

PATENT NO. : 4,852,154

DATED : July 25, 1989

INVENTOR(S) : David R. Lewis, et al.

It is certified that error appears in the above-identified patent and that said Letters Patent is hereby corrected as shown below:

Column 2, line 42, delete "men" and insert therefor --menu--.

Column 3, line 9, delete "ma" and insert therefor --may--.

Column 3, line 15, delete "describe" and insert therefor --described--.

Column 3, line 65, delete "EMBODIMENT" and insert therefor --EMBODIMENTS--

Column 7, line 47, after "by" insert --a called number in response to said telephone identified by--.

UNITED STATES PATENT AND TRADEMARK OFFICE
CERTIFICATE OF CORRECTION

PATENT NO. : 4,852,154

DATED : July 25,1989

INVENTOR(S) : David R. Lewis, et al.

It is certified that error appears in the above-identified patent and that said Letters Patent is hereby corrected as shown below:

Column 7, line 49, after "for" insert --subscriber selection of a specific one of a plurality--.

Column 8, line 17, after "data" insert --,--.

Column 8, line 62, delete "said calling" and insert therefor --a called--.

Column 9, line 17, delete "member" and insert therefor --number--.

Column 9, line 46, delete "mote" and insert therefor --more--.

Column 11, line 18, after "signal" insert --generating means for generating a signal--.

Column 12, line 1, after "means" insert --generates said signal and said identifying means--.

Column 12, line 16 after "number" insert --detected--.

Signed and Sealed this

Fifth Day of March, 1991

Attest:

HARRY F. MANBECK, JR.

*Attesting Officer*     *Commissioner of Patents and Trademarks*